United States Patent [19]

Kasuga et al.

[11] Patent Number: 4,547,565

[45] Date of Patent: Oct. 15, 1985

[54] METHOD FOR MANUFACTURING TRIOXANE COPOLYMER

[75] Inventors: Takuzo Kasuga, Tokyo; Takeshi Asano, Fuji; Yukio Ikenaga, Fuji; Masami Yamawaki, Fuji; Yasuyuki Takeda, Fuji; Koichi Ichimura, Fuji, all of Japan

[73] Assignee: Polyplastics Company, Ltd., Osaka, Japan

[21] Appl. No.: 618,717

[22] Filed: Jun. 8, 1984

[30] Foreign Application Priority Data

Jun. 17, 1983 [JP] Japan .............................. 58-109052

[51] Int. Cl.$^4$ .............................................. C08G 2/10
[52] U.S. Cl. .................................. 528/232; 528/233; 528/236; 528/238; 528/240; 528/241; 528/242; 528/243; 528/481
[58] Field of Search ............... 528/232, 233, 236, 238, 528/240, 241, 242, 243, 481

[56] References Cited

U.S. PATENT DOCUMENTS

| | | | |
|---|---|---|---|
| 2,989,506 | 6/1961 | Hudgin et al. | 528/241 |
| 3,252,940 | 5/1966 | Mantell | 528/232 X |
| 3,436,375 | 4/1969 | McAndrew | 528/241 |
| 3,513,223 | 5/1970 | Smart et al. | 528/238 X |
| 4,343,929 | 8/1982 | Sugio et al. | 528/241 |

*Primary Examiner*—Lucille M. Phynes
*Attorney, Agent, or Firm*—Robert M. Shaw

[57] ABSTRACT

A trioxane copolymer is manufactured by adding to trioxane and a co-monomer, 0.0001 to 2.0 percent by weight, based on the total weight of the monomers, of one or more sterically hindered phenols, then co-polymerizing the resultant mixture in the presence of a cation-active catalyst, and then treating the resultant copolymer by heating it at a temperature which is higher than the melting point of the copolymer to melt the copolymer and decompose and remove unstable parts of the copolymer.

12 Claims, No Drawings

METHOD FOR MANUFACTURING TRIOXANE COPOLYMER

The present invention relates to an improved method of manufacturing trioxane copolymer by copolymerizing trioxane as the major component with some other comonomer which is copolymerizable therewith.

The method of manufacturing polyacetal copolymer by copolymerizing trioxane with a cyclic ether such as ethylene oxide, or a cyclic formal in the presence of a cation-active catalyst such as boron trifluoride and subjecting the copolymer thus obtained to various stabilizing treatments is already well known and is being practiced in industrial applications. However, in this copolymerization reaction, successive solidification and agglomeration occurs with advancing polymerization from liquid monomers, so that temperature control becomes harder toward the end of the polymerization reaction and the reaction is not stable, lacking uniformity in the temperature distribution in the polymerization reaction system. Consequently, undesirable phenomena such as depolymerization reaction leading to reduction in the polymerization yield, or cleavage of the main chain resulting in notable decrease in the molecular weight are observed. Moreover, undesirable decomposition such as cleavage of the main chain often takes place during after-treatments including separation of unreacted monomers, cleaning, drying or, especially, stabilizing treatment for decomposing and removing unstable terminals of the copolymer, detracting from achieving uniform quality and properties of the product. Heretofore, various proposals regarding polymerization apparatuses, etc., have been presented with the aim at having uniform polymerization temperature, but they are not adequate.

As a result of their assiduous studies for improvement in regard to these difficulties, the present inventors have found that undesirable side effects such as reduction in the yield due to depolymerization during the polymerization or decrease in the molecular weight resulting from cleavage of the main chain can be inhibited by adding to monomers prior to the polymerization reaction a sterically hindered phenol, which is normally used as antioxidant, to be uniformly present in the polymerization reaction system, and that in the reaction product polymerized in this manner, because of the sterically hindered phenol being uniformly dispersed in the form copolymer, deterioration of the product such as cleavage of the main chain of molecules, etc., occurs less frequently in after-treatment including separation of unreacted monomers by evaporation by heating after the polymerization, separation of the monomers by cleaning, drying, melting treatment, etc. These findings have led to this invention.

Thus the present invention relates to the method of manufacturing trioxane copolymer by copolymerizing trioxane as the main component with monomer which is copolymerizable therewith in the presence of a cation-active catalyst, characterized in that 0.001 to 2.0% by weight of a sterically hindered phenol based on the total amount of monomers is added to the monomers prior to the polymerization, the copolymerization is performed in the presence of this phenol and the copolymer obtained in this manner is melted by heating at temperatures above its melting point to decompose and remove unstable parts of the copolymer, thereby obtaining a stable copolymer. Trioxane is used as the major monomer, but a preferable amount thereof is from 99.99 to 75 wt.% and the balance is the other monomer(s).

According to this invention, a sterically hindered phenol is added to monomers prior to the polymerization. Heretofore, stabilizing polymer by adding thereto sterically hindered phenols as antioxidants, followed by melting and kneading, is already well known and polyacetal resins now industrially manufactured are compositions with sterically hindered phenols added and kneaded into the resins. In such instances, however, the addition of sterically hindered phenols is made at least after the polymerization reaction has been accomplished. In most cases, they are added and kneaded into solid polymer after unreacted monomers have been separated. It has never been attempted to carry out the polymerization in the presence of a phenol which has been added to monomers prior to the polymerization as in the method of this invention, because this substance is commonly considered to have some deleterious effect on the polymerization reaction. Quite contrarily, the result of the attempt by the present inventors to conduct the polymerization with addition of a specified amount of a sterically hindered phenol to monomers prior to the polymerization has proved that it does not interfere with the polymerization reaction at all, but rather the polymerization yield is improved, because the depolymerization is suppressed by the addition of such a material during the polymerization reaction and, moreover, decomposition or cleavage of the main chain is controlled, resulting in increased molecular weight. In addition, it has turned out that in the reaction product obtained by polymerizing monomers with addition of a sterically hindered phenol, as compared not only with the product of the reaction conducted without addition of this phenol or even with that with the phenol added, as in the prior art process, after the polymerization, undesirable decomposition reactions such as cleavage of the main chain of the polymer resulting in decrease in the molecular weight are inhibited because of the presence of the sterically hindered phenol being uniformly dispersed in the polymer in various after-treatment processes, e.g., evaporation to separate residual monomers by heating the polymerized reaction product under reduced or normal pressure or in nitrogen or air stream or separation of monomers by washing the polymerized reaction product with water or some organic solvent, etc., followed by drying by heating and the like processes. They have also ascertained that this method is quite effective in the stabilizing treatment for selective composition and removal of only unstable parts by treating the polymerized reaction product in its molten state by heating it to temperatures above its melting point, and that a copolymer of stable quality and properties can be obtained even under fairly drastic conditions.

The sterically hindered phenols which are used in this invention are those generally known as antioxidants or free radical inhibitors. The following compounds may be mentioned as examples: 2,2'-methylenebis(4-methyl-6-t-butyl-phenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)propionate, 1,3,5-trimethyl-2,4,6-tris(3,5-di-t-butyl-4-hydroxybenzyl)benzene, n-octadecyl 3-(4'-hydroxy-3',5'-di-t-butylphenyl)propionate, 4,4'-methylenebis(2,6-di-t-butylphenol), 4,4'-butylidenebis(6-t-butyl-3-methylphenol), 2,2'-thiodiethylbis[3-(3,5-di-t-butyl-4-hydroxyphenyl)]propionate, distearyl-3,5-di-t-butyl-4-hydroxybenzyl phosphonate, 2-t-butyl-6-(3-t-butyl-5-methyl-2-hydroxybenzyl)-4-methylphenyl acrylate, of which at least one compound may be employed. These examples do not suggest limitation, but all other sterically hindered phenols of the similar kind are effective. Particularly effective among them are: hexamethylene glycol bis(3,5-di-t-butyl-4-hydroxyhydrocinnamate), e.g., Irganox 259 (a product of CIBA-GEIGY); tetrakis[methylene(3,5-di-t-butyl-4-hydroxyhydrocinnamate)]methane, e.g., Irganox 1010 (a product of CIBA-GEIGY); and triethylene glycol bis-3-(3-t-butyl-4-hydroxy-5-methylphenyl)propionate, e.g., Irganox 245 (a product of CIBA-GEIGY). However, when antioxidants other than sterically hindered phenols, for example, amines, amidines or other materials generally used as stabilizers for polyacetal were added to monomers, polymerization reaction did not take place. Thus it was impossible to attain the effect of the method of this invention.

Even a very minute amount of sterically hindered phenol added to monomers prior to the polymerization is effective. A range of 0.001 to 2.0% by weight based on the amount of total monomers, preferably 0.005 to 1.0% by weight, is useful. Too small addition naturally gives a scanty effect, while too large amounts tend to retard the polymerization reaction and are undesirable economically. When only the effect for the polymerization reaction is expected, very small amounts within the aforementioned range will suffice, but relatively large amounts of phenol may be incorporated in the polymer by adding it in the monomer stage, in consideration of the use of the polymer under stringent conditions as a commercial product after its after-treatments.

As the method of adding these sterically hindered phenols to monomers, they may be dissolved directly in liquid monomers or solutions of them in small amounts of a solvent which is inert to the polymerization may be added to the monomers. In the case of continuous polymerization, a definite amount of phenol may be continuously fed into the monomer line leading to the polymerizer, so that it may be mixed and dissolved in the monomers to be fed to the polymerizer, or it may be added and dissolved in the monomers in their storage tanks.

As the polymerization catalysts employed in exercising the method of this invention, any well known cation-active catalyst which is generally used for polymerization of trioxane, etc., may be chosen. The examples include: Lewis acids including, especially, halides of boron, tin, titanium, phosphorus, arsenic and antimony, e.g., boron trifluoride, tin tetrachloride, titanium tetrachloride, phosphorus pentachloride, phosphorus pentafluoride, arsenic pentafluoride and antimony pentafluoride and their complex compounds or salts; protonic acids, e.g., perchloric acid; protonic acid esters, particularly, those of perchloric acid with lower aliphatic alcohols, e.g., t-butyl perchlorate; protonic acid anhydrides, particularly, mixed anhydrides of perchloric acid and lower aliphatic carboxylic acids, e.g., acetyl perchlorate; trimethyloxonium hexafluorophosphate, triphenylmethyl hexafluoroarsenate, acetyl tetrafluoroborate, acetyl hexafluorophosphate and acetyl hexafluoroarsenate. Particularly preferred polymerization catalysts are boron trifluoride, boron trifluoride diethyletherate, boron trifluoride di-n-butyl etherate, triethyloxonium tetrafluoroborate, etc.

By the method of this invention, trioxane may be copolymerized with at least one comonomer which is polymerizable therewith. Such comonomers include those which form polymers having branched or reticulated structure in their molecules. Examples of such comonomers are cyclic ethers represented by the formula,

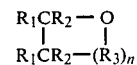

(where $R_1$ and $R_2$ each stands for hydrogen, lower alkyl or lower halogen-substituted alkyl group; $R_3$ is methylene, oxymethylene, lower alkyl- or halogenoalkyl-substituted methylene, or lower alkyl- or halogenoalkyl-substituted oxymethylene group and n represents 0 to 3), e.g., epichlorohydrin, ethylene oxide, 1,3-dioxolane, diethylene glycol formal, 1,4-butanediol formal, 1,3-dioxane, 4-phenyldioxolane, propylene oxide and phenoxypropene oxide; further, cyclic esters, e.g., $\beta$-propiolactone, and vinyl compounds, e.g., styrene and acrylonitrile. As comonomers for providing a branched or reticular structure, mentioned are alkyl mono(or di)-glycidyl ethers (or formals), e.g., methyl glycidyl formal, ethyl glycidyl formal, propyl glycidyl formal, butyl glycidyl formal, ethylene glycol diglycidyl ether, triethylene glycol diglycidyl ether and bis(1,2,6-hexanetriol)triformal.

In performing the polymerization by the method of this invention, it is, of course, possible to regulate the molecular weight of polymer by use of a conventional chain transfer agent such as low molecular weight acetal for adjusting the molecular weight in conjunction with catalysts and comonomers. Thus the method of this invention is advantageous in that control of molecular weight is possible at high accuracy, because irregular decomposition reactions during the polymerization and thereafter are inhibited.

Usable as polymerizing apparatus in exercising this invention, are Ko-kneader, twin-screw continuous extruder-mixer, twin-paddle continuous mixer and other trioxane polymerizers hitherto proposed, and this method is also applicable when two or more polymerizers are used in combination. It will be readily understood that the method of this invention is effective even when temperature control is inadequate and that it is more effective for prevention of deterioration in handling solid agglomerated reaction product for relatively long periods of time to achieve a higher polymerization yield, or for prevention of decomposition when temperature control is difficult in large polymerizers.

One of the important features of the method of this invention consists in the effect in the after-treatment process intended for stabilization of copolymer after accomplishing the polymerization reaction. Thus its effect is quite apparent when unstable parts in copolymer are selectively decomposed and removed by subjecting the polymer obtained as above-described to a stabilizing treatment by melting it at temperatures above its melting point. In this way, deterioration of the polymer such as decrease in the molecular weight due to cleavage of the main chain, may be markedly curbed. This stabilizing treatment by melting the product may be performed, after the completion of the polymerization, directly after suspending the reaction by adding to the reaction product a catalyst deactivator, e.g., amine or amidine compounds or hydroxides, inorganic salts, carboxylic acid salts, or alkoxides of alkali or alkaline earth metals; after removing unreacted trioxane by evaporation (vaporization) by heat treatment at temperatures below 150° C. under normal or reduced pressure in nitrogen or air stream; or after washing off unreacted monomers by treating the polymerized reaction product with water, an organic solvent or their mixture containing a polymerization catalyst deactivator, followed by drying.

Generally, a reaction product obtained by copolymerization reaction contains unreacted monomers and even copolymer deprived of unreacted monomers by separation has unstable parts at terminals of its molecule. Removing them by decomposition is indispensable in order to have the copolymer in stable, practical to use form. Heretofore, a method of decomposing and removing unstable parts by melting the copolymer by heating it to temperatures above its melting point has been proposed, but it is very difficult to decompose and remove the unstable parts only without causing decrease in molecular weight, because the decomposition reaction of the unstable parts and the reaction of cleavage of the main chain proceed in parallel. To counter this problem, addition to copolymer of various stabilizers for prevention of cleavage of the main chain, for example, antioxidants or alkaline materials including amines, amidines, amides, and hydroxides, inorganic and organic acid salts, and alkoxides of alkali or alkaline earth metals has been proposed. These proposed methods are generally effective, but can hardly be said to be adequate.

When, according to the method of this invention, a sterically hindered phenol which serves as an antioxidant is added to monomers before being polymerized and remains therein during the polymerization, not only is a copolymer which itself has less unstable parts obtained, but decrease in the molecular weight when performing stabilization by melting as an after-treatment is more perfectly prevented and the effect of prevention of the decrease in the molecular weight due to cleavage of the main chain is large, as compared not only with copolymers produced without addition of any sterically hindered phenol but also with copolymers to which a sterically hindered phenol was added after the polymerization to adhere on their particle surfaces and which were then subjected to melting treatment by heating. The present method permits use of more rigorous treating conditions in temperature, etc., and is, therefore, quite effective in promoting selective decomposition and removal of unstable parts, while suppressing decline in the molecular weight.

The sterically hindered phenol added to the monomers according to the method of this invention does not come out dissolved in the washing solution even when the product is washed at significantly high temperatures after the polymerization, but it has been confirmed to be remaining in the polymer without undergoing changes from the amount initially added to the monomers. Its presence in a state of uniform dispersion in the interior of the copolymer is believed to be conductive to such an effect. Further, according to the method of this invention, as compared with the method of adding the sterically hindered phenol to the polymerized copolymer, only very small amounts of the sterically hindered phenol needs to be added. When added after the polymerization, this substance, being powder, tends to be separated and scattered away from the copolymer surface before the melting treatment or to adhere to and accumulate on the wall of the container, causing various troubles in operation. Such inconveniences may be averted in the process of this invention.

The stabilization treatment by melting according to the method of this invention has as its indispensable precondition adding a sterically hindered phenol to monomers before being polymerized, to remain not only during the polymerization, but also during the after-treatments as well. However, it does not exclude addition prior to the stabilization treatment by melting of stabilizer components of various types, e.g., addition of amine compounds, amidine compounds, amide compounds, or hydroxides, inorganic salts, salts of organic acids such as carboxylic acids or alkoxides of alkali or alkaline earth metals, supplemental addition of sterically hindered phenols or other antioxidants, and their joint uses are, of course, possible. Moreover, in the stabilization treatment by melting, a small amount in a range not in excess of 10% by weight of water, organic solvent or their mixture, based on the copolymer, may be left adhering on the copolymer or may be added before or during the melting treatment. The presence of such a small amount of water is effective for promoting decomposition and scattering of unstable parts in the copolymer.

For the melting stabilization for use with the method of this invention, whatever equipment hitherto proposed may be usable, for example, various types of single-screw extruders with venthole, twin-serew extruders with venthole and other continuously mixing, heating and deairing devices suitable for highly viscous materials may be used. In such apparatus, it is essential to provide ventholes or deairing exhaust holes and it is desirable to promote discharge of gases generated by decomposition of the copolymer, or water or the like which has been preliminarily added by sucking air inside the apparatus through such holes to effect evacuation or pressure reduction therein. Adequate kneading, surface renewal, expansion of effective deairing area, etc., are desirable conditions.

The resin temperature for effecting stabilization by melting according to this invention needs to be higher than at least the melting point of the polymer, a temperature range up to 100° C. higher than the melting point being appropriate. A treatment time on the order of 1 to 30 minutes is adequate, depending on the amount of unstable parts of the copolymer. Generally, short time periods are enough at high temperatures, while long periods are required at relatively low temperatures.

Furthermore, before conducting the thermal stabilization treatment of this invention, all additives necessary for the final product including various stabilizers, lubricants, nucleating agents, mold release agents, coloring agents, inorganic fillers such as glass, and high-molecular or low-molecular organic modifiers are added and kneaded; and, after the treatment, the product is pelletized to effect stabilization and thereby obtain a uniform granular polyacetal composition product. However, it is, of course, possible to make the product by performing the treatment for the sole purpose of removing the unstable parts of the copolymer and, thereafter, separately adding various necessary components to it and kneading the mixture.

Embodiments of this invention will now be described in the following examples, though the invention is, of course, not limited to these embodiments. Terms and measuring methods used in these Examples and Comparative Examples shall be as defined hereunder unless otherwise specified:

% or ppm:
  All expressed on a weight basis.
Polymerization yield:
  Percentage (by weight) of polymer obtained after the treatment based on the total monomer feed.
MI:
  Melt index (g/10 min) measured at 190° C. Appraised as characteristic value corresponding to the molecular weight. Thus the lower the MI, the higher the molecular weight. (Provided that, in order to prevent decomposition during the measurement, approximately 1% of stabilizer shall be added and mixed.)
Rate of alkali decomposition:
  Put 1 g of copolymer in 100 ml of a 50% aqueous solution of methanol containing 0.5% of ammonium hydroxide. Then, after heating them in a closed container at 180° C. for 45 minutes, determine the amount of formaldehyde which has been decomposed and dissolved in the solution. This amount is indicated by % based on the polymer.
Rate of weight loss by heating:
  This rate is measured by heating in air at 220° C. for 45 minutes 5 g of copolymer which has been pulverized and dried in vacuum.

EXAMPLES 1 TO 4

A continuous mixing reactor equipped with a barrel having a section formed of two circles of 80 mm ID partly overlapping each other and an effective length of 1.3 m and having on its outside a jacket which permits passage of heating medium and provided in its inside with two rotational shafts fitted with a large number of paddles which engage with each other was used. Warm water of 80° C. was passed through the jacket and two rotary shafts were rotated at a speed of 100 rpm in different directions. Copolymerization was performed by continuously feeding to one end of said reactor at a rate of 10 kg per hour, trioxane containing 2.5% of ethylene oxide and having added and dissolved therein 0.05% of tetrakis[methylene-(3,5-di-t-butyl-4-hydroxyhydrocinnamate)]methane (Irganox 1010, a product of CIBA-GEIGY) and continuously adding simultaneously to the same container a cyclohexane solution of boron trifluoride butyl etherate at a rate of 60 ppm in terms of boron trifluoride based on the total amount of the monomer; the reaction mixture discharged from the other end was immediately thrown into water containing 0.1% of butylamine, stirred at 80° C. for 1 hour and, after removing liquid, dried at 135° C. for 2 hours. Various measurements taken of the polymer obtained at this stage gave the values as listed in the table below. It should be noted, however, that the rate of weight loss by heating was measured after addition of 0.5% of 2,2'-methylenebis(4-methyl-6-t-butylphenol) and 0.1% of dicyandiamide as stabilizers to the polymer thus obtained.

| Polymerization yield | MI | Rate of alkali decomposition | Rate of weight loss by heating | Melting point |
|---|---|---|---|---|
| 71% | 4.6 | 1.9% | 1.7% | 168° C. |

The dried copolymers thus obtained, to which the materials listed in Table 1 were added, were heated, melted, kneaded (at approximately 230° C. resin temperature) and extruded, while sucking at a pressure of 300 mmHg, using a single-screw extruder with venthole of 40 mm ID, to obtain copolymer pellets. Properties of these copolymers are listed in Table 1.

COMPARATIVE EXAMPLES 1 TO 8

The compolymerization was conducted in the similar manner and under the same conditions but without the addition of tetrakis[methylene(3,5-di-t-butyl-4-hydroxyhydrocinnamate)]methane and copolymers with properties as shown in the table below were obtained. In these examples also, measurements of the rate of weight loss by heating were taken with the same stabilizers as those used in the above-mentioned Examples added to the polymers obtained.

| Polymerization yield | MI | Rate of alkali decomposition | Rate of weight loss by heating | Melting point |
|---|---|---|---|---|
| 88% | 6.1 | 2.9% | 3.1% | 168° C. |

The dried copolymers thus obtained, to which compounds shown in Table 1 had been added, were heated, melted, kneaded and extruded, while sucking, using a screw extruder similarly as in Examples 1 to 4, to obtain copolymer pellets. Properties of the copolymers thus obtained are shown in Table 1.

TABLE 1

| | Sterically hindered phenol added to monomers (note 1) | Sterically hindered phenol added in the melting treatment (note 1) | Another (or other) additive(s) added in the melting treatment | Properties after the melting treatment (note 2) | | |
|---|---|---|---|---|---|---|
| | | | | MI | Rate of alkali decomposition | Rate of thermal decomposition (note 3) |
| Example 1 | 0.05% | — | — | 4.9 (+0.3) | 1.6% (−0.3%) | 1.3% (−0.4%) |
| Comparative example 1 | — | — | — | 11.2 (+5.1) | 5.2% (+2.3%) | 5.0% (+1.9%) |
| Comparative example 2 | — | 0.05% | — | 9.8 (+3.7) | 4.7% (+1.8%) | 4.6% (+1.5%) |
| Example 2 | 0.05% | — | 1% of dicyandiamide 0.1% | 4.7 (+0.1) | 1.4% (−0.5%) | 1.2% (−0.5%) |
| Comparative example 3 | — | — | Same as above | 9.8 (+3.7) | 3.9% (+1.0%) | 3.7% (+0.6%) |
| Comparative example 4 | — | 0.05% | Same as above | 9.2 (+3.1) | 3.8% (+0.9%) | 3.6% (+0.5%) |
| Example 3 | 0.05% | — | 3% of aqueous solution containing 5% of tributylamine | 4.7 (+0.1) | 1.0% (−0.9%) | 0.8% (−0.9%) |
| Comparative example 5 | — | — | Same as above | 9.1 (+3.0) | 3.2% (+0.3%) | 3.4% (+0.3%) |
| Comparative | — | 0.05% | Same as above | 8.8 | 2.9% | 2.8% |

TABLE 1-continued

| | Sterically hindered phenol added to monomers (note 1) | Sterically hindered phenol added in the melting treatment (note 1) | Another (or other) additive(s) added in the melting treatment | Properties after the melting treatment (note 2) | | |
|---|---|---|---|---|---|---|
| | | | | MI | Rate of alkali decomposition | Rate of thermal decomposition (note 3) |
| example 6 | | | | (+2.7) | (0%) | (−0.3%) |
| Example 4 | 0.05% | — | 0.1% of calcium stearate and 1.0% of water | 4.7 (+0.1) | 1.1% (−0.8%) | 0.9% (−0.8%) |
| Comparative example 7 | — | — | Same as above | 9.2 (+3.1) | 3.0% (+0.1%) | 3.3% (+0.2%) |
| Comparative example 8 | — | 0.05% | Same as above | 8.9 (+2.8) | 2.7% (−0.2%) | 2.6% (−0.5%) |

Note 1:
Tetrakis [methylene(3,5-di-t-butyl-4-hydroxyhydrocinnamate)]methane (Irganox 1010, a product of CIBA-GEIGY) was used.
Note 2:
Numerals in parentheses show amounts of change due to melting treatment.
Note 3:
Measurements were taken with addition of 0.5% of 2,2'-methylenebis(4-methyl-6-t-butylphenol) and 0.1% of dicyandiamide.

EXAMPLES 5 TO 6

A similar continuous mixing reactor as that used in the aforementioned examples was employed. Warm water at 80° C. was passed through a jacket and two rotary screws were rotated in different directions at a speed of 80 rpm. Copolymerization was carried out by continuously feeding at a rate of 8 kg per hour into said reactor from one end thereof trioxane containing 2.5% of ethylene oxide and having 0.5% of hexamethylene glycol bis(3,5-di-t-butyl-4-hydroxyhydrocinnamate) (Irganox 259, a product of CIBA-GEIGY) added and dissolved therein and, simultaneously therewith, continuously adding to the same container a cyclohexane solution of boron trifluoride butyl etherate at a rate of 70 ppm in terms of boron trifluoride based on the total amount of the monomer; the reaction mixture discharged from the other end was immediately transferred into another reaction vessel held at 80° C., to continue the polymerization reaction for an additional 10 minutes; thereafter, the product was washed by throwing it into water containing 0.1% of tributylamine, dehydrated and dried by blowing overnight at 70° C. Various measurements of the polymer obtained at this stage gave the values as shown in the table below. The measurements of weight loss by heating were taken after addition of 0.5% of 2,2'-methylenebis(4-methyl-6-t-butylphenol) and 0.1% of dicyandiamide as stabilizers to the obtained polymer.

| Polymerization yield | MI | Rate of alkali decomposition | Rate of weight loss by heating | Melting point |
|---|---|---|---|---|
| 92% | 7.7 | 3.5% | 3.1% | 169° C. |

The dried copolymers thus obtained, to which the substances shown in Table 2 had been added, were heated, melted, kneaded (at approx. 235° C. resin temperature) and extruded, while sucking through venthole at a pressure of 100 mm Hg, using a twin-screw extruder with venthole of 40 mm ID. Properties of the copolymers thus obtained are shown in Table 2.

COMPARATIVE EXAMPLES 9 TO 12

The copolymerization was performed in the similar manner and under the same conditions as those in the above-described examples, but without addition of hexamethylene glycol bis(3,5-di-t-butyl-4-hydroxyhydrocinnamate) (Irganox 259, a product of CIBA-GEIGY) and copolymers which gave the properties as listed in the table below were obtained. Here again the values of weight loss by heating were obtained by measurements taken with the same stabilizers as those used in Examples added to the polymers obtained.

| Polymerization yield | MI | Rate of alkali decomposition | Rate of weight loss by heating | Melting point |
|---|---|---|---|---|
| 89% | 9.1 | 5.1% | 5.4% | 169° C. |

The dried copolymers thus obtained, to which the substances shown in Table 2 had been added, were heated, melted, kneaded and extruded, while sucking, using an extruder as in Examples 5 to 6, to obtain the copolymer. Properties of the copolymer are shown in Table 2.

TABLE 2

| | Sterically hindered phenol added to monomers (note 4) | Sterically hindered phenol added in the melting treatment (note 4) | Additive other than that in the left columns added in the melting treatment | Properties after the melting treatment (note 5) | | |
|---|---|---|---|---|---|---|
| | | | | MI | Rate of alkali decomposition | Rate of thermal decomposition (note 6) |
| Example 5 | 0.5% | — | 0.2% of melamine | 7.6 (−0.1) | 1.8% (−1.7%) | 1.2% (−1.9%) |
| Comparative example 9 | — | — | Same as above | 10.3 (+1.2) | 5.0% (−0.1%) | Very high |
| Comparative example 10 | — | 0.5% | Same as above | 9.9 (+0.8%) | 3.7% (−1.4%) | 3.9 (−1.5%) |
| Example 6 | 0.5% | — | 0.2% of polyamide (note 7) | 7.7 (0) | 2.0% (−1.5%) | 1.3% (−1.8%) |
| Comparative example 11 | — | — | Same as above | 11.5 (+2.4) | 5.6% (+0.5%) | Very high |

TABLE 2-continued

| | Sterically hindered phenol added to monomers (note 4) | Sterically hindered phenol added in the melting treatment (note 4) | Additive other than that in the left columns added in the melting treatment | Properties after the melting treatment (note 5) | | |
|---|---|---|---|---|---|---|
| | | | | MI | Rate of alkali decomposition | Rate of thermal decomposition (note 6) |
| Comparative example 12 | — | 0.5% | Same as above | 9.8 (+0.7) | 4.1% (−1.0%) | 4.2% (−1.2%) |

Note 4:
Hexamethylene glycol bis(3,5-di-t-butyl-4-hydroxyhydrocinnamate) (Irganox 259, a product of CIBA-GEIGY) was used.
Note 5:
Numerals in parentheses give rates of change resulting from melting treatment.
Note 6:
Measurements were taken without particular addition of stabilizers.
Note 7:
Nylon-12 ("Daiamide", a product of Daicel) was used.

We claim:

1. A method for manufacturing a trioxane copolymer, comprising the steps of: (1) adding to trioxane and at least one co-monomer which is co-polymerizable with trioxane, 0.001 to 2.0 percent by weight, based on the total weight of the monomers, of one or more sterically hindered phenols, and then (2) co-polymerizing the resultant mixture in the presence of a cation-active catalyst, and then (3) treating the resultant copolymer by heating to a temperature which is higher than the melting point of the copolymer to melt the copolymer and decompose and remove unstable parts of the copolymer.

2. The method of claim 1, wherein in step (1) the trioxane monomer is present in an amount of 99.99 to 75 percent by weight based on the total weight of the monomer mixture.

3. The method of claim 1 or 2, wherein the sterically hindered phenol is selected from the group consisting of 2,2'-methylenebis(4-methyl-6-t-butylphenol), hexamethyleneglycol bis(3,5-di-t-butyl-4-hydroxy-hydrocinnamate), tetrakis[methylene(3,5-di-t-butyl-4-hydroxyhydrocinnamate]methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butylphenol)propionate, 4,4'-methylenebis(2,6-di-t-butylphenol), 4,4-butylidene-bis(6-t-butyl-3-methyl-phenol), 2,2'-thiodiethyl-bis-[3-(3,5-di-t-butyl-4-hydroxyphenyl)]propionate, di-stearyl-3,5-di-t-butyl-4-hydroxybenzyl-phosphonate, 2-t-butyl-6-(3,t-butyl-5-methyl-2-hydroxybenzyl)-4-methylphenylacrylate and mixtures thereof.

4. The method of claim 3 wherein the sterically hindered phenol is selected from the group consisting of hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)propionate, and mixtures thereof.

5. The method of claim 1 or 2 wherein in step (1) the sterically hindered phenol is added in an amount within the range of 0.005 to 1.0% by weight based on the total weight of the monomers.

6. The method of claim 1 wherein the cation-active catalyst is selected from the group consisting of Lewis acids, protonic acids, protonic acid esters, protonic acid anhydrides, trimethyloxonium hexafluorophosphate, triphenylmethyl hexafluoroarsenate, acetyl tetrafluoroborate, acetyl hexafluorophosphate and acetyl hexafluoroarsenate.

7. The method of claim 6, wherein the cation-active catalyst is selected from the group consisting of boron trifluoride, tin tetrachloride, titanium tetrachloride, phosphorus pentachloride, phosphorus pentafluoride, arsenic pentafluoride and antimony pentafluoride and their complex compounds or salts, perchloric acid acetal perchlorate, trimethyloxonium hexafluorophosphate, triphenylmethyl hexafluoroarsenate, acetyl tetrafluoroborate, acetyl hexafluorophosphate and acetyl hexafluoroarsenate.

8. The method of claim 1 wherein the cation-active catalyst is selected from the group consisting of boron trifluoride, boron trifluoride di-n-butyl etherate, and triethyloxonium tetrafluoroborate.

9. The method of claim 1 or 2 wherein the co-monomer is selected from the group consisting of cyclic esters, vinyl compounds, alkyl mono- or di-glycidyl ethers, and cyclic ethers represented by the formula

wherein: $R_1$ and $R_2$ each stands for a hydrogen atom, a lower alkyl group or a lower halogen-substituted alkyl group; $R_3$ is methylene, oxymethylene, lower alkyl- or halogenoalkyl-substituted methylene, or lower alkyl- or halogenoalkyl-substituted oxymethylene group and n is 0 to 3.

10. The method of claim 9 wherein the co-monomer is selected from the group consisting of epichlorohydrin, ethylene oxide, 1,3-dioxolane, diethylene glycol formal, 1,4-butanediol formal, 1,3-dioxane, 4-phenyldioxalane, propylene oxide, phenoxypropene oxide, B-propiolactone, styrene, acrylonitrile, methyl glycidyl formal, ethyl glycidyl formal, propyl glycidyl formal, butyl glycidyl formal, ethylene glycol diglycidyl ether, triethylene glycol diglycidyl ether and bis(1,2,6-hexanetriol)triformal.

11. The method of claim 1 or 2 wherein in step (3) the copolymer is heated to a temperature of up to 100° C. higher than its melting point.

12. The method of claim 11, wherein the copolymer is treated in step (3) for from 1 to 30 minutes.

* * * * *